United States Patent [19]
Fuziak

[11] Patent Number: 6,065,832
[45] Date of Patent: May 23, 2000

[54] EYEGLASSES WITH INTEGRATED REAR VIEW MIRRORS

[76] Inventor: Robert J. Fuziak, P.O. Box 8646, Jackson, Wyo. 83002

[21] Appl. No.: 09/241,943

[22] Filed: Feb. 2, 1999

[51] Int. Cl.[7] .................................................. G02C 11/02
[52] U.S. Cl. .............................................................. 351/50
[58] Field of Search ................................... 351/50, 41, 158

[56] References Cited

U.S. PATENT DOCUMENTS

| D. 327,079 | 6/1992 | Allen | D16/102 |
|---|---|---|---|
| 4,798,454 | 1/1989 | Hyun | 351/50 |
| 4,896,956 | 1/1990 | Berker et al. | 351/50 |
| 5,044,741 | 9/1991 | Giacomi | 351/50 |

*Primary Examiner*—Hung Xuan Dang
*Attorney, Agent, or Firm*—William E. Hein

[57] ABSTRACT

A pair of eyeglasses includes rear view mirrors, each having a mirror surface substantially equal in area to that of a lens of the eyeglasses, that may be folded forwardly and outwardly to an open position for use, and that may later be folded rearwardly and inwardly to a closed postion for retention by the temple members of the eyeglasses when not in use. The rear view mirrors are somewhat concave in shape so that when in the closed position against the temple members, the eyeglasses present the appearance of conventional eyeglasses.

4 Claims, 2 Drawing Sheets

EYEGLASSES WITH INTEGRATED REAR VIEW MIRRORS

BACKGROUND AND SUMMARY OF THE INVENTION

This invention relates generally to eyeglasses and, more particularly, to eyeglasses that incorporate rear view mirrors. The ability to look to the rear without turning one's head is important to persons engaged in various activities, such as bicyclists, runners, in-line skaters, etc. The ability to see motor vehicles, bicycles, and persons approaching from behind is essential to the safe enjoyment of many sports activities, as well as to the safety of persons living in high crime areas.

Several known eyeglasses including rear view mirrors are known in the prior art. Exemplary of such eyeglasses are those taught in U.S. Pat. Nos. 4,798,454, 5,044,741, and Des. 327,079. U.S. Pat. No. 4,798,454 to Hyun describes a pair of eyeglasses in which spring-loaded rear view mirrors extend longitudinally forward from each temple piece. The result is a complex structure that is unattractive, since the rear view mirrors do not retract out of sight. U.S. Pat. No. 5,044,741 to Giacomi is directed to a questionably functional pair of eyeglasses employing tiny rear view mirrors that do not extend outside the periphery of the eyeglass lenses, thereby severely limiting the wearer's rearward vision. U.S. Pat. No. Des. 327,079 to Allen is directed to a pair of eyeglasses having fragilely attached tiny rear view mirrors that also limit the wearer's rearward field of vision and that include no provision for securely retaining them in the closed or folded position.

It would therefore be advantageous to provide eyeglasses that include rear view mirrors, each having a surface area substantially the same as the area of each of the eyeglass lenses, that may be folded forwardly and outwardly to an open position when in use, and that may later be folded rearwardly and inwardly to a closed position against the associated temple member for retention thereby when not in use. It would also be advantageous that the eyeglasses present the appearance of conventional eyeglasses when the rear view mirrors are in the closed position.

DESCRIPTION OF THE PREFERRED EMBODIMENT

Figure 1:
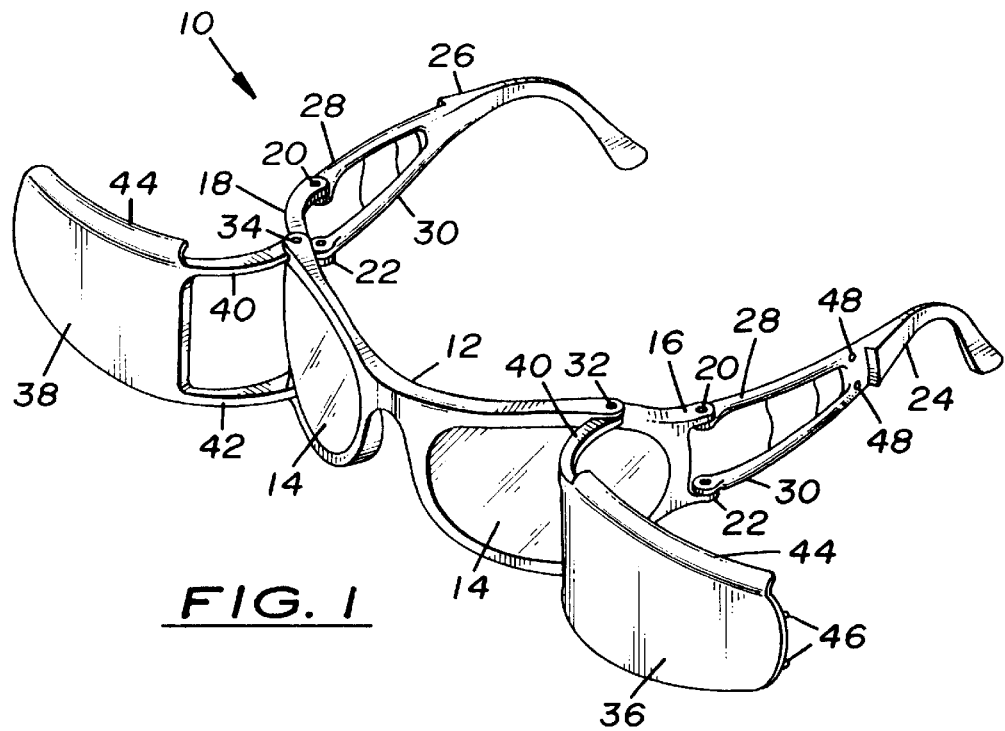
FIG. 1 is a pictorial diagram of a pair of eyeglasses in accordance with the present invention in which a pair of integral rear view mirrors are shown in their extended positions.

Referring now variously to FIGS. 1–4, there is shown a pair of eyeglasses 10 having a frame member 12 for retaining conventional lenses 14. Frame member 12 includes forked temple extension portions 16, 18 extending outwardly and rearwardly at the left and right sides thereof. Each of the forked temple extension portions 16, 18 of frame member 12 includes upper and lower temple hinge points 20, 22. Left and right temple members 24, 26 include upper and lower, forwardly extending temple forks 28, 30 that are attached to frame member 12 at the temple hinge points 20, 22 thereof. Located forwardly and inwardly from the temple hinge points 20, 22 on frame 12 are left and right upper mirror hinge points 32, 34. Two lower mirror hinge points are located along the bottom edge of frame member 12 in correspondence with upper mirror hinge points 32, 34. Left and right mirror assemblies 36, 38 include upper and lower inwardly extending fork members 40, 42 that are hingedly attached, respectively, to the left and right upper mirror hinge points 32, 34 and the corresponding lower mirror hinge points to hingedly support the mirror assemblies 36, 38. A mirror portion of each of the left and right mirror assemblies 36, 38 extends arcuately outward from fork members 40, 42. A concave inner surface of the mirror portion of each of the left and right mirror assemblies 36, 38 contains a mirror 50 that is conventionally bonded thereto. Each of the mirrors 50 has a surface area that is preferably approximately equal to the surface area of each of the eyeglass lenses 14. Each of the mirror assemblies 36, 38 is formed to include an inwardly curved lip 44 across the top edge thereof and a corresponding inwardly curved lip 45 across the bottom edge thereof. Each of the mirror assemblies 36, 38 further includes a pair of protrusions 46 provided on the inner surface at the distal end thereof. Two mating indentations 48 are correspondingly provided on the outer surface of each of the temple members 24, 26 toward the distal ends thereof for snapping engagement by the protrusions 46 when each of the mirror assemblies 36, 38 is folded rearwardly into its retracted or storage position to thereby retain the mirror assemblies 36, 38 in that position.

Figure 2:
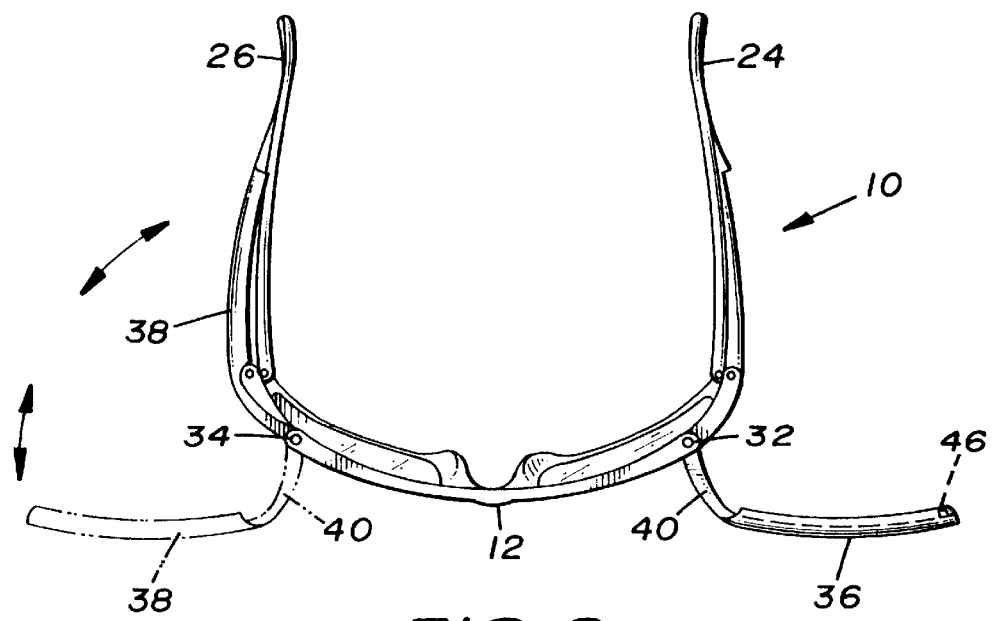
FIG. 2 is a top view of the eyeglasses of FIG. 1 illustrating the way in which the rear view mirrors are hingedly moved to a retracted or storage position.
Figure 3:
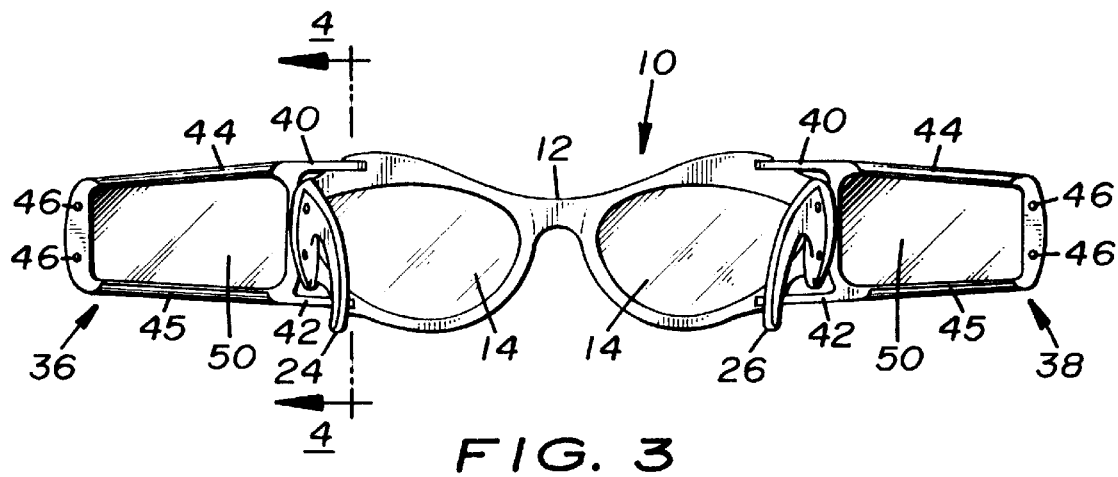
FIG. 3 is a rear elevation view of the eyeglasses of FIGS. 1 and 2, illustrating the rear view mirrors in their extended positions.
Figure 4:
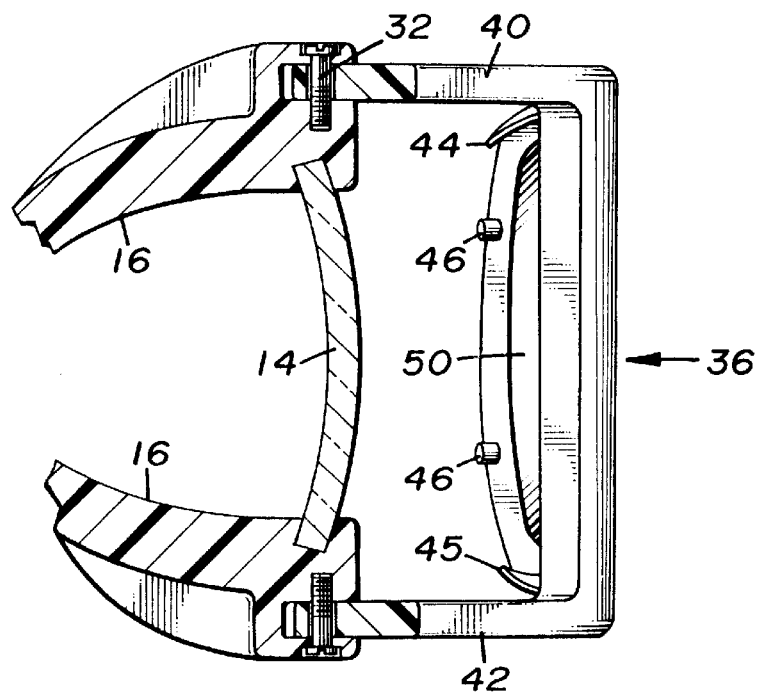
FIG. 4 is a sectional diagram taken along the line 4—4 of FIG. 3.

In use, the mirror assemblies 36, 38 are folded forwardly into the positions illustrated in FIGS. 1–3 so that the wearer of eyeglasses 10 may view what is to the rear while looking ahead. When not in use, mirror assemblies 36, 38 may be quickly and easily folded rearwardly, as illustrated in connection with mirror assembly 38 in FIG. 2, such that they lie against temple members 24, 26 and are retained in that position by the snapping engagement of protrusions 48 and mating indentations 48.

I claim:

1. A rear view mirror assembly integrally combined with a pair of eyeglasses, comprising:

a rearwardly curved frame, the frame having left and right forked temple extension portions extending outwardly and rearwardly at left and right sides thereof, each of the forked temple extensions of said frame having upper and lower temple hinge points;

a pair of lenses fixedly mounted within said frame;

a pair of temple members, each having upper and lower forwardly extending temple forks hingedly attached to respective ones of the left and right forked temple extension portions of said frame at said upper and lower temple hinge points;

upper and lower mirror hinge points correspondingly located, respectively, along upper and lower edges of said frame, said upper and lower mirror hinge points located forwardly and inwardly from said temple hinge points;

a pair of mirror assemblies having upper and lower inwardly extending fork members hingedly attached, respectively, at said upper and lower mirror hinge points of said frame, each of the mirror assemblies having a mirror portion extending arcuately outward from said fork members, each of the mirror portions having a concave inner surface, each inner surface comprising a mirror surface;

a pair of protrusions positioned on the inner surface of each of said mirror assemblies at a distal end thereof; and a pair of mating indentations correspondingly positioned on an outer surface of each of the temple members for snapping engagement by said protrusions when each of the mirror assemblies is folded rearwardly into a retracted position adjacent said temple members to thereby securely retain the mirror assemblies in that position.

2. A rear view mirror assembly integrally combined with a pair of eyeglasses as in claim 1, wherein each of the mirrors has a surface area substantially the same as the surface area of each of the lenses.

3. A rear view mirror assembly integrally combined with a pair of eyeglasses as in claim 1, wherein each of the mirror assemblies includes an inwardly curved lip extending along top and bottom edges thereof that overlie upper and lower edges, respectively, of said temple members when each of the mirror assemblies is folded rearwardly into a retracted position adjacent said temple members.

4. A rear view mirror assembly integrally combined with a pair of eyeglasses as in claim 1, wherein said mirror surface comprises a mirror bonded to said inner surface of said mirror portion of each of said mirror assemblies.

* * * * *